(12) United States Patent
Rundkvist et al.

(10) Patent No.: US 6,680,855 B1
(45) Date of Patent: Jan. 20, 2004

(54) METHOD AND ARRANGEMENT FOR EXPANDING THE POWER OUTPUT CAPACITY OF A POWER PLANT

(75) Inventors: Kjell Rundkvist, Lindingo (SE); Kjell Lövqvist, Huddinge (SE)

(73) Assignee: Ermerson Energy Systems AB (SE)

(*) Notice: Subject to any disclaimer, the term of this patent is extended or adjusted under 35 U.S.C. 154(b) by 0 days.

(21) Appl. No.: 10/070,841

(22) PCT Filed: Sep. 7, 2000

(86) PCT No.: PCT/SE00/01738
§ 371 (c)(1), (2), (4) Date: Jul. 29, 2002

(87) PCT Pub. No.: WO01/20759
PCT Pub. Date: Mar. 22, 2001

(65) Prior Publication Data
(65)

(30) Foreign Application Priority Data
Sep. 10, 1999 (SE) .................................. 9903227

(51) Int. Cl.⁷ ................................................ H02M 7/17
(52) U.S. Cl. ......................................................... 363/69
(58) Field of Search .......................... 363/65, 67, 69, 363/70

(56) References Cited
U.S. PATENT DOCUMENTS 4,451,773 A * 5/1984 Papathomas et al. ....... 320/128
4,633,412 A * 12/1986 Ebert et al. ................. 700/286
5,319,536 A * 6/1994 Malik ........................... 363/65

FOREIGN PATENT DOCUMENTS

| EP | 0 547 418 A2 | 6/1993 |
| EP | 0 772 288 A2 | 5/1997 |

* cited by examiner

*Primary Examiner*—Adolf D. Berhane
(74) *Attorney, Agent, or Firm*—Harness, Dickey & Pierce P.L.C.

(57) ABSTRACT

To expand the power output capacity of a power plant comprising a first and a second rectifier connected in parallel to a varying load, the output voltage of the first rectifier being essentially constant within its load current operating range, said second rectifier is controlled to supply, at said first rectifier output voltage (U1), a constant load current (0.8×I3max) that is lower than its maximum current (I3max) to shift the operating range of said first rectifier correspondingly to higher current values. Said second rectifier is controlled to supply, at a predetermined lower output (U3") voltage, load currents between said constant load current (0.8×I3max) and said maximum current (I3max) in response to maximum current (I1max) from said first rectifier. In response to load currents that are lower than said constant load current (0.8×I3max), the output voltage is limited to a predetermined higher voltage (U3').

6 Claims, 2 Drawing Sheets

US 6,680,855 B1

METHOD AND ARRANGEMENT FOR EXPANDING THE POWER OUTPUT CAPACITY OF A POWER PLANT

TECHNICAL FIELD

The invention relates generally to power plants, and more specifically to how the power output capacity of a power plant can be expanded.

BACKGROUND OF THE INVENTION

In a more and more competitive market with more and quicker product changes, operators within the telecommunication field have a need of expanding the power output capacity of their existing power plants by adding power systems thereto without being restricted to just power systems from the manufacturer of the existing power plant.

In order for the manufacturer of the added power system to take on the responsibility for the combined power plant, the signal systems of the original power plant and the added power system should not be mixed.

It is known per se to extend the power output capacity of an existing power plant comprising a set of rectifiers by connecting an additional set of rectifiers in parallel with the existing set of rectifiers to a varying load.

So far, such an expansion has required the control systems of the two sets of rectifiers to be combined.

Most often, this is very difficult, since the control system of the existing power plant is totally unknown to the manufacturer of the added power system although the output voltage of the existing power plant is known.

SUMMARY OF THE INVENTION

The object of the invention is to bring about a method and an arrangement for expanding the power output capacity of a power plant without any need of having to combine any control systems.

This is attained in accordance with the invention mainly by shifting the operating range of the existing power system to higher current values by setting the added power system to supply, at the output voltage of said first rectifier, a constant load current that is lower than its maximum current.

Moreover, in response to maximum current from the existing power system, the added power system is controlled to supply load currents between the set constant load current and its maximum current. These load currents are supplied by the added power system at a predetermined lower voltage than the output voltage of the existing power system.

Hereby, the power output capacity of the power plant is expanded without any need of having to combine the two control systems.

BRIEF DESCRIPTION OF THE DRAWINGS

The invention will be described more in detail below with reference to the appended drawings, on which

DESCRIPTION OF THE INVENTION

Figure 1:
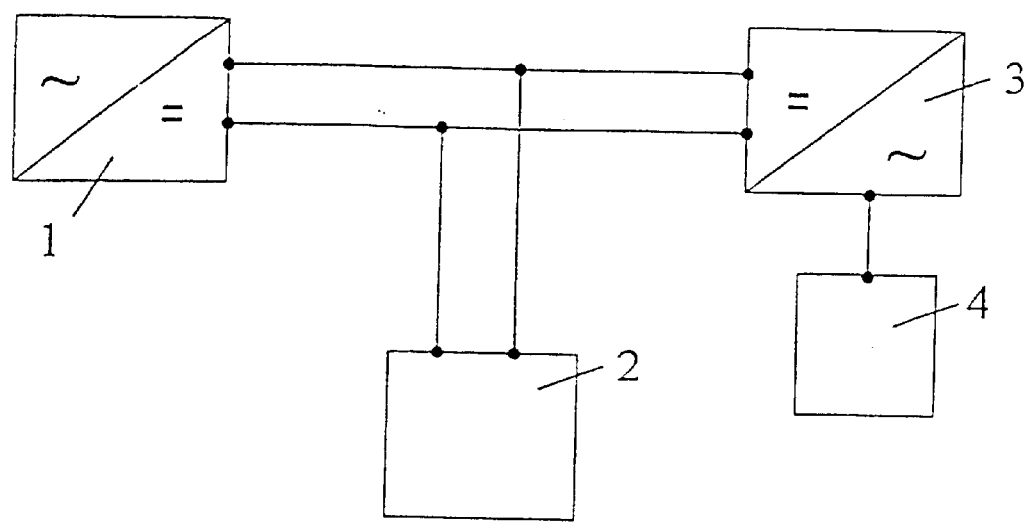
FIG. 1 is a schematic block diagram of an embodiment of an arrangement according to the invention.

FIG. 1 is a block diagram of an embodiment of an arrangement according to the invention.

Reference numeral 1 denotes a set of rectifiers, below just called rectifier 1, the output of which is connected to a varying load 2.

Figure 2:
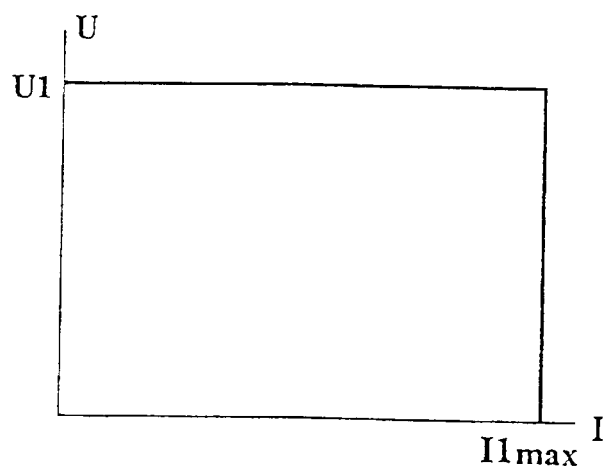
FIGS. 2–4 are diagrams of voltage vs. load current in the different blocks in FIG. 1.

The rectifier 1 is supposed to be an existing power system for supplying the load 2 with load current. It is also supposed that the output voltage of the rectifier 1 is known to be essentially constant at a voltage U1 for any load current within its load current operating range from zero to I1max, as illustrated by an output voltage vs. output current diagram in FIG. 2.

In order to expand the power output capacity of the existing power system, another set of rectifiers, below just denoted rectifier 3, is connected with its output in parallel with the output of rectifier 1 to the load 2.

In order not to have to combine the control systems of the rectifiers 1 and 3, the rectifier 3 is controlled by means of a control unit 4 independently of the rectifier 1 in accordance with the invention.

Figure 3:
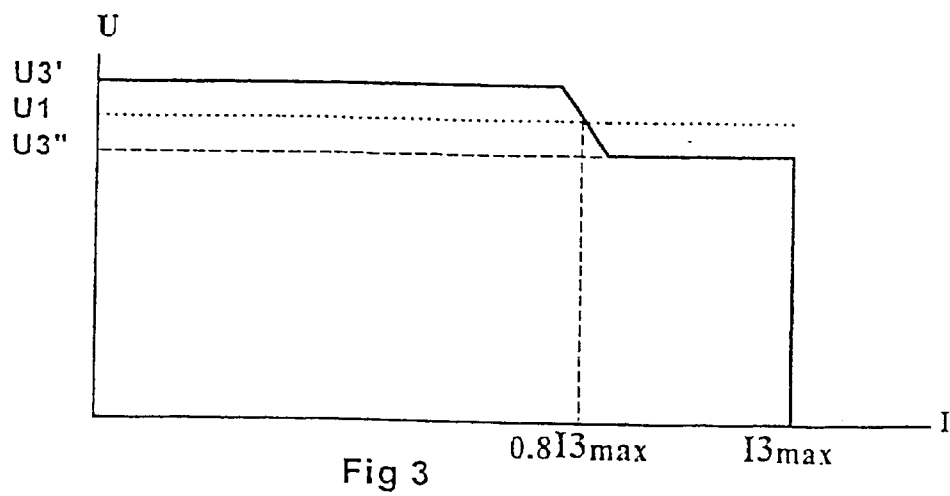

FIG. 3 is a diagram illustrating output voltage vs. output current of the rectifier 3 when operating alone with a load.

In accordance with the invention, the output voltage of the rectifier 3 is controlled by the control unit 4 to a higher output voltage U3' than the output voltage U1 of the rectifier 1 up to a predetermined percentage of its maximum output current I3max, and to a lower output voltage U3" than the output voltage U1 of the rectifier 1 between that predetermined percentage of its maximum output current and its maximum output current I3max. Normally, the control unit 4 controls the output voltage of the rectifier 3 in such a manner that U3'−U1=U1−U3".

The predetermined percentage of the maximum output current I3max of the rectifier 3 can be between 50 and 90% of I3max, preferably 80% of I3max, i.e. 0.8×I3max as indicated in FIG. 3.

Figure 4A:
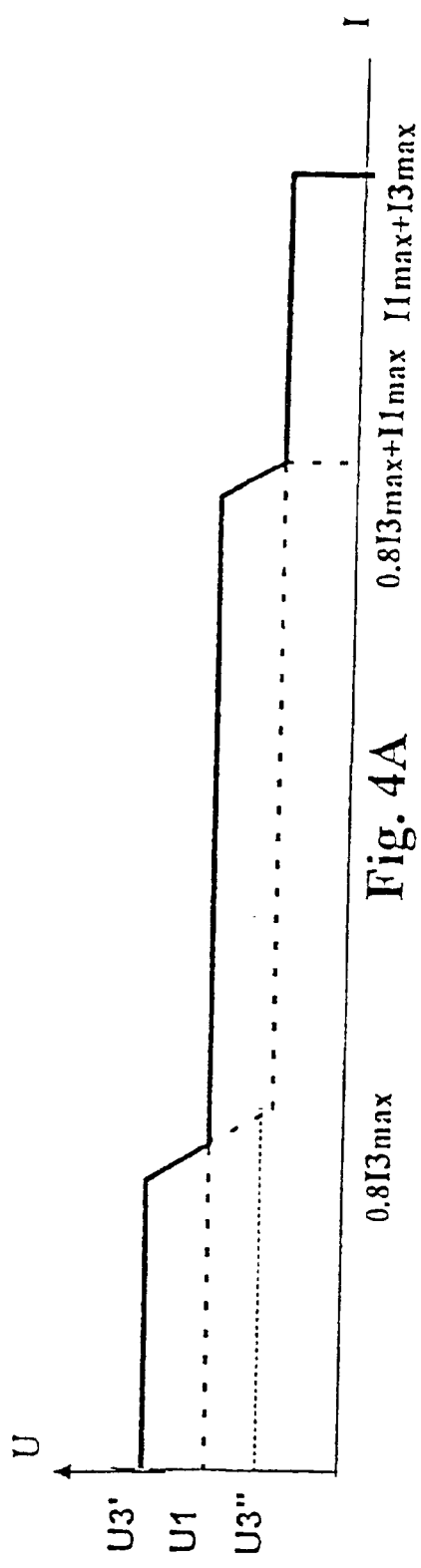

FIG. 4A is a diagram illustrating the output voltage U vs. the output current I of the combined rectifiers 1 and 3.

Since the output voltage of the rectifier 3 is controlled to a higher voltage U3' than the output voltage U1 of the rectifier 1 up to 0.8×I3max as indicated in FIG. 3, all current to the load 2 up to 0.8×I3max will be supplied by the rectifier 3 in the embodiment illustrated.

When the output current equals 0.8×I3max as detected by the control unit 4, the control unit 4 controls the rectifier 3 to lower its output voltage and supply a constant current equal to 0.8×I3max.

Thus, for load currents between 0.8×I3max and 0.8×I3max+I1max, the load current is so divided between the rectifiers 3 and 1 that the rectifier 3 is constantly supplying 0.8×I3max, while the rectifier 1 is supplying the rest.

When the load current increases above 0.8×I3max+I1max, the rectifier 1 cannot supply more current. As a consequence, the rectifier 1 goes into current limitation and the output voltage will drop.

When the output voltage has dropped to U3", the rectifier 3 will maintain the voltage constant at this level U3" and supply the rest of the current up to I1max+I3max.

Thus, by controlling the rectifier 3 by means of the control unit 4 to supply, at the output voltage U1 of the rectifier 1, a constant load current of 0.8×I3max, the operating range of the rectifier 1 is shifted to correspondingly higher current values. Hereby, the operating range of the combined rectifiers 1 and 3 are extended in comparison with the operating range of the rectifier 1 alone.

Figure 4B:
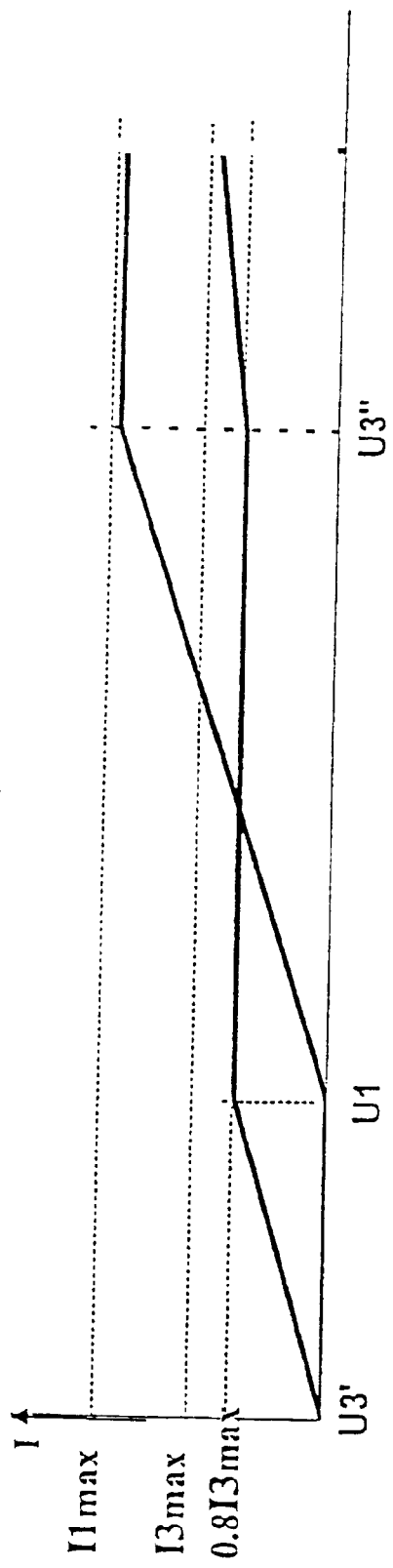

FIG. 4B illustrates the resulting output currents I1 and I3 from the rectifiers 1 and 3, respectively.

The normal operating range of the combined rectifiers 1 and 3 is between 0.8×I3max and 0.8×I3max+I1max.

Below the normal operating range, i.e. for load currents up to 0.8×I3max, all current is supplied by the rectifier 3.

In the normal operating range of the combined rectifiers 1 and 3, 0.8×I3max is constantly supplied by the rectifier 3, while the rest of the load current is supplied by the rectifier 1, i.e. from zero to I1max.

Above the normal operating range, i.e. for load currents higher than 0.8×I3max+I1max, the rectifier 1 constantly supplies I1max and the rest is supplied by the rectifier 3 up to I1max+I3max.

As should be apparent from the above, by controlling the added power system, i.e. the rectifier 3, as described above, the power output capacity is expanded without any need of combining the control systems of the existing and the added power systems.

What is claimed is:

1. A method of expanding the power output capacity of a power plant comprising a first and a second rectifier connected in parallel to a varying load, the output voltage of the first rectifier being essentially constant within its load current operating range, characterized by controlling said second rectifier to supply, at said first rectifier output voltage, a constant load current that is lower than its maximum current to shift the operating range of said first rectifier correspondingly to higher current values, controlling said second rectifier to supply, at a predetermined lower output voltage, load currents between said constant load current and said maximum current in response to maximum current from said first rectifier, and limiting the output voltage to a predetermined higher voltage in response to load currents that are lower than said constant load current.

2. The method as claimed in claim 1, characterized by controlling said second rectifier to supply between 50 and 90% of its maximum current at said first rectifier output voltage.

3. The method as claimed in claim 2, characterized by controlling said second rectifier to supply 80% of its maximum current.

4. An arrangement for expanding the power output capacity of a power plant, comprising a first and a second rectifier (1, 3) connected in parallel to a varying load (2), the output voltage (U1) of the first rectifier (1) being essentially constant within its load current operating range, characterized in that the arrangement comprises a control unit (4) connected to said second rectifier (3), said control unit (4) comprising means for controlling said second rectifier (3) to supply, at said first rectifier output voltage (U1), a constant load current (0.8×I3max) that is lower than its maximum current (I3max) to shift the operating range of said first rectifier (1) correspondingly, to higher current values, means for controlling said second rectifier (3) to supply, at a predetermined lower output voltage (U3"), load currents between said constant load current (0.8×I3max) and said maximum current (I3max) in response to maximum current (I1max) from said first rectifier (1), and means for limiting the output voltage to a predetermined higher voltage (U3') in response to load currents that are lower than said constant load current (0.8×I3max).

5. The arrangement as claimed in claim 4, characterized in that said means for controlling said second rectifier (3) is adapted to control said second rectifier to supply between 50 and 90% of its maximum current (I3max) at said first rectifier output voltage (U1).

6. The arrangement as claimed in claim 5, characterized in that said means for controlling said second rectifier (3) is adapted to control said second rectifier to supply 80% of its maximum current (I3max) at said first rectifier output voltage (U1).

* * * * *

UNITED STATES PATENT AND TRADEMARK OFFICE
CERTIFICATE OF CORRECTION

PATENT NO. : 6,680,855 B1
DATED : January 20, 2004
INVENTOR(S) : Kjell Rundkvist et al.

It is certified that error appears in the above-identified patent and that said Letters Patent is hereby corrected as shown below:

<u>Title page,</u>
Item [75], Inventors, "Lindingo" should be -- Lidingo --.
Item [73], Assignee, "Ermerson" should be -- Emerson --.

Signed and Sealed this

Fifteenth Day of June, 2004

JON W. DUDAS
*Acting Director of the United States Patent and Trademark Office*